United States Patent [19]

Unger et al.

[11] Patent Number: 5,541,234
[45] Date of Patent: Jul. 30, 1996

[54] PROCESS FOR MAKING LOW DENSITY HYDROGEL MATERIALS HAVING HIGH SURFACE AREAS

[75] Inventors: Peter D. Unger, Convent Station; Ronald P. Rohrbach, Flemington, both of N.J.

[73] Assignee: AlliedSignal Inc., Morris Township, N.J.

[21] Appl. No.: 461,087

[22] Filed: Jun. 5, 1995

Related U.S. Application Data

[60] Division of Ser. No. 27,975, Mar. 8, 1993, which is a continuation-in-part of Ser. No. 811,757, Dec. 29, 1991, abandoned.

[51] Int. Cl.⁶ .................................................. C08J 9/28
[52] U.S. Cl. ............................. 521/66; 521/65; 521/141; 521/155; 521/170; 521/186; 521/187
[58] Field of Search ............................... 521/66, 65, 141, 521/155, 170, 186, 187

[56] References Cited

U.S. PATENT DOCUMENTS

| | | | |
|---|---|---|---|
| 2,040,880 | 5/1936 | Rigby | 18/54 |
| 4,002,173 | 1/1977 | Manning et al. | 128/296 |
| 4,110,164 | 8/1978 | Sutthoff et al. | 195/63 |
| 4,181,649 | 1/1980 | Matsushita et al. | 260/112.5 R |
| 4,308,377 | 12/1981 | Koshugi | 536/20 |
| 4,336,070 | 6/1982 | Koshugi | 106/122 |
| 4,376,199 | 3/1983 | Koshugi | 536/20 |
| 4,532,321 | 7/1985 | Castle et al. | 536/20 |
| 4,574,150 | 3/1986 | Austin | 536/20 |
| 4,619,995 | 10/1986 | Hayes | 536/20 |
| 4,659,700 | 4/1987 | Jackson | 514/55 |
| 4,675,113 | 6/1987 | Graves et al. | 210/635 |
| 4,833,237 | 5/1989 | Kawamura et al. | 536/20 |
| 4,879,340 | 11/1989 | Moriguchi et al. | 525/54.2 |
| 4,895,724 | 1/1990 | Cardinal et al. | 424/418 |
| 4,966,919 | 10/1990 | Williams, Jr. et al. | 521/54 |
| 4,975,542 | 12/1990 | Hirayama et al. | 536/20 |
| 5,032,619 | 7/1991 | Frutin et al. | 521/55 |
| 5,057,606 | 10/1991 | Garbe | 536/54 |
| 5,089,606 | 2/1992 | Cole et al. | 536/54 |
| 5,164,186 | 11/1992 | Tsuru et al. | 424/422 |
| 5,169,535 | 12/1992 | Adachi et al. | 210/669 |
| 5,175,093 | 12/1992 | Seifert | 435/41 |
| 5,322,935 | 6/1994 | Smith | 536/20 |
| 5,328,939 | 7/1994 | Smith | 521/187 |

FOREIGN PATENT DOCUMENTS

| | | |
|---|---|---|
| 0289238A2 | 11/1988 | European Pat. Off. . |
| 0424672A1 | 5/1991 | European Pat. Off. . |
| 0446473A2 | 9/1991 | European Pat. Off. . |
| 2282905 | 3/1976 | France . |
| 3527482A1 | 2/1986 | Germany . |
| 58-57401 | 4/1983 | Japan . |
| 61-133143 | 6/1986 | Japan . |
| 70401 | 3/1987 | Japan . |
| 2178447 | 2/1987 | United Kingdom . |
| WO93/12877 | 7/1993 | WIPO . |
| WO95/12632 | 5/1995 | WIPO . |

OTHER PUBLICATIONS

Pool, "New Lightest Aerogel is Nothing to Look At", Research News, p. 807, (1900).
Sibilia, "A Guide to Materials Characterization and Chemical Analysis", pp. 273–275, (1988).
Mantell, "The Water–Soluble Gums", Reinhold Publishing Corporation, pp. 174–209, (1947).
Anderson, "From Aquagels to Aerogels", pp. 63 & 64, *Materials Research Society Bulletins*, (Mar. 1991).
Peppas, "Preparation Methods and Structure of Hydrogels", Hydrogels in Medicine & Pharmacy, vol. 1 Fundamentals, CRC Press, Inc., pp. 1–25, (1986).
ASTM–D1621–94 in 1994 Annual Book of ASTM Stds., pp. 351–353.
O'Sullivan, "New Propellant System Devised for Aerosol Packaging", Chem. & Eng. News, pp. 21–22, (Jan. 13, 1992).
Kunststoffe, vol. 71(3), pp. 183 & 184, (Mar., 1981).
McNeely, "Chitin and Its Derivatives", pp. 304–210, (1959).
Seagel, "A safe, new, non–toxic Material with Multiple Uses", Lawrence Livermore National Laboratory, University of California.
Vorlop, et al., "Entrapment of Microbial Cells in Chitosan", vol. 135, Methods in Enzymology, pp. 259–269 (1987).
Vorlop, et al., "Formation of Spherical Chitosan Biocatalysts by Ionotropic Gelation," Biotechnology Letters, vol. 3, No. 1, pp. 9–14, (1981).
English Abstract to EP 0 446 473 A2 (1991).
English Abstract to JP 60 215 003 (1985).
English Abstract to JP 60 186 504 (1985).
English Abstract to JP 57 011 258 (1982).
English Abstract to JP 58 029 801 (1983).
English Abstract to FR 2 282 905 (1976).
English Abstract to DE 35 27 482 (1986).
English Abstract to JP 58–57401 (1983).
Rohrbach, et al. "A Versatile Low Density Polysaccharide Matrix", Biomolecular Materials by Design, 330 Materials Research Society Symposium Proceedings, pp. 231–235 (1994).

*Primary Examiner*—Christopher W. Raimund
*Attorney, Agent, or Firm*—Michele G. Mangini; Roger H. Criss

[57] ABSTRACT

A process for making a crosslinked, highly porous body derived from a water-soluble, hydrogel polymer, wherein the porous body is characterized in that it has an open-celled 3-dimensional lattice structure, a density of less than about 1.0 g/cm³, a surface area of equal to or greater than about 30 m²/g, and a compression strength of equal to or less than about 75% yield at 300 psi.

10 Claims, 6 Drawing Sheets

PROCESS FOR MAKING LOW DENSITY HYDROGEL MATERIALS HAVING HIGH SURFACE AREAS

CROSS REFERENCE TO RELATED APPLICATION

This application is a division of application Ser. No. 08/027,975, filed Mar. 8, 1993, pending, which is a continuation-in-part of abandoned application Ser. No. 07/811,757, Dec. 29, 1991.

FIELD OF INVENTION

This invention relates to novel porous bodies which possess a low density and a high surface area as well as one or more other beneficial properties such as pore volume and strength characteristics, which makes them suitable for many industrial applications, such as insulating materials, fibers, absorbents, adsorbents, ion-exchange resins, membranes and support materials for a wide variety of uses. The porous bodies have an open-celled 3-dimensional lattice structure.

DESCRIPTION OF THE PRIOR ART

Numerous attempts have been made to make low density solid materials. For instance, U.S. Pat. No. 4,110,164 to Sutthoff et al. teaches a porous granule produced by mixing a modified cellulose and a densification agent into an agglomerated fibrous ion exchange composite that may be useful in immobilizing enzymes.

U.S. Pat. No. 4,675,113 to Graves et al. discloses porous beads comprising calcium alginate and magnetite that are suitable for affinity chromatography. The porous beads are formed by dripping an admixture of alginic acid and magnetite into a calcium chloride solution. The alginic/magnetite admixture may further contain triethanolamine titanium, a crosslinking agent, to provide additional physical strength.

Aerogels are examples of highly porous materials. Aerogels have been made from iron and tin oxides, aluminas, tungsten, biopolymers and, more commonly, silicas. The first aerogels were produced in the early 1930's (Kistler, Stanford University) by exchanging the water in an aqueous solution of sodium silicate with an alcohol, and then removing the alcohol under high temperature and pressure (81 bars, 240° C.). The aerogels have densities in the range of 0.03 to 0.3 $g/cm^3$ Recently, Hrubesh of The Lawrence Livermore National Laboratory modified the technique by using a condensed silica form, base catalyst and supercritical fluid extraction to achieve porous solids of silica aerogels having ultra low density of about 0.005 $g/cm^3$ (See, Robert Pool *Science,* 247 (1990), at 807). One disadvantage of such materials is that at these densities the porous solids have limited strength properties. Secondly, the aerogels can be somewhat difficult to modify (chemically) for various commercial applications. Another disadvantage of the Hrubesh method is the use of the expensive supercritical fluid extraction procedure.

Others have attempted to crosslink polymeric gel materials, such as chitosan. For example, Japanese Patent Publication No. 61-133143, published Jun. 20, 1986, and U.S. Pat. No. 4,833,237 to Kawamura et al. disclose crosslinked granular bodies derived from a low molecular weight chitosan. The process for producing the chitosan bodies comprises dissolving a low molecular weight chitosan into an aqueous acidic solution, pouring the solution into a basic solution to form porous, granular gel bodies of chitosan, thoroughly replacing the water contained in the granular gel bodies with a polar solvent, and then crosslinking the granular bodies with an organic diisocyanate. However, it has been found that the water-solvent replacement process causes a significant portion of the pores, especially fine pores, to collapse, preventing the crosslinking agent from having access to form crosslinks. Consequently, the resultant product is swellable and has significantly reduced surface area.

SUMMARY OF THE INVENTION

The present invention provides a crosslinked, highly porous body derived from a water-soluble, hydrogel polymer. The porous body is characterized in that it has an open-celled 3-dimensional lattice structure, a density of less than about 1.0 $g/cm^3$, a surface area of equal to or greater than about 30 $m^2/g$, and a compression strength of equal to or less than about 75% yield at 300 psi, and is derived from a polymer is selected from the group consisting of alginates, gums, starch, dextrins, agar, gelatins, casein, collagen, polyvinyl alcohol, polyethylenimine, acrylate polymers, starch/acrylate copolymers, and mixtures and copolymers thereof.

The present invention further provides a process for making a crosslinked, highly porous body comprising the steps of dissolving a hydrogel polymer in a gelling solvent, forming a gel from the dissolved polymer solution into a desired configuration, gradually replacing the gelling solvent with a crosslinking solvent by employing a concentration gradient solvent exchange process, adding a crosslinking agent to crosslink the gel, and isolating the crosslinked gel from the crosslinking solvent, wherein the porous body is characterized in that it has an open-celled 3-dimensional lattice structure, a density of less than about 1.0 $g/cm^3$, a surface area of equal to or greater than about 30 $m^2/g$, and a compression strength of equal to or less than about 75% yield at 300 psi.

The present invention also provides a process for making a highly porous body comprising the steps of dissolving a crosslinked, hydrogel polymer in a gelling solvent that contains an additive selected from the group consisting of surfactants, elastomeric additives, and polyols; forming a gel from the dissolved polymer solution into a desired configuration; freeze-drying the gel; adding a crosslinking solvent to the freeze-dried gel; adding a crosslinking agent to the crosslinking solvent, and isolating the crosslinked gel from the crosslinking solvent, wherein the porous body is characterized in that it has an open-celled 3-dimensional lattice structure, a density of less than about 1.0 $g/cm^3$, a surface area of equal to or greater than about 30 $m^2/g$, and a compression strength of equal to or less than about 75% yield at 300 psi.

The present porous bodies exhibit numerous beneficial properties including low density and high surface area as well as high pore volume and excellent strength characteristics. In addition, the porous bodies have excellent dimensional stability even after thorough dehydration and rehydration, especially at high levels of crosslinkage in such levels that are not possible to accomplish using the prior art solvent exchange processes.

DESCRIPTION OF THE DRAWINGS

FIG. 1 depicts a section of the open-celled 3-dimensional lattice of a porous body of this invention. The porous body 1 has pores 2, which form a continuous network of pores.

DETAIL DESCRIPTION OF THE INVENTION

Figure 1:
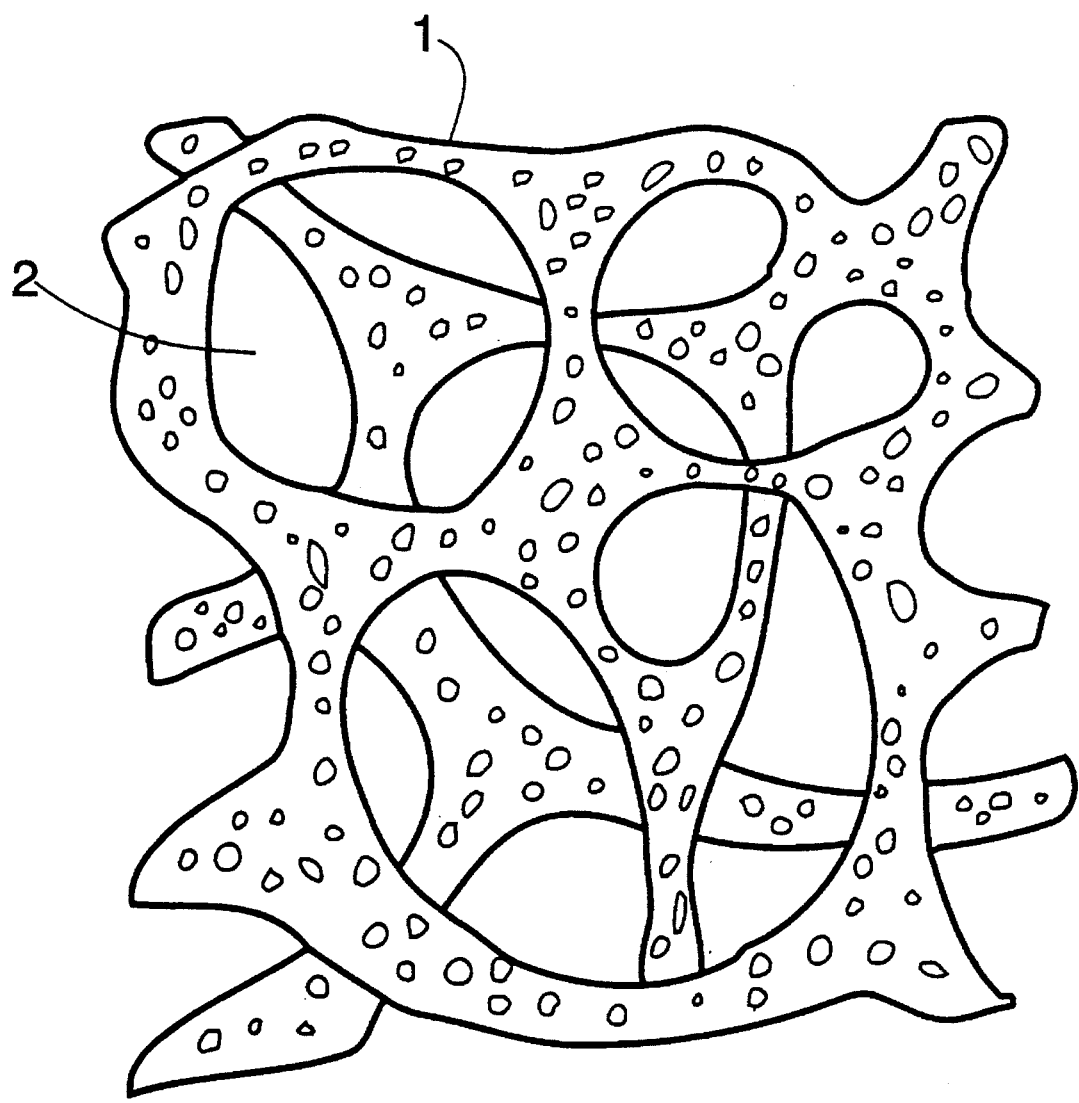
FIG. 1 is a schematic drawing which depicts a porous body of this invention and its open-celled 3-dimensional lattice structure.

As mentioned above, the present invention provides highly porous, high-strength crosslinked bodies derived from hydrogel polymers. Hydrogel polymers are water soluble polymeric materials that absorb water to form free-flowing gel-like substances, pregels. The pregels are set or coagulated to form porous gels that are free-standing, and then crosslinked with an appropriate crosslinking agent to form the high-strength porous bodies of the present invention. The porous hydrogel bodies have a 3-dimensional open-celled lattice structure, for example, as illustrated in FIG. 1. The term lattice as used herein refers to an open framework of crosslinked polymer.

The porous hydrogel bodies of the present invention have a low density of less than about 1.0 $g/cm^3$, preferably less than or equal to about 0.5 $g/cm^3$, more preferably less than or equal to about 0.3 $g/cm^3$, and most preferably less than or equal to 0.2 $g/cm^3$. In other preferred embodiments, the density is equal to or less than 0.15 $g/cm^3$, and more preferably less than about 0.1 $g/cm^3$ or even less than about 0.05 $g/cm^3$. However, preferably, the bodies have a minimum density which is at least sufficient to maintain the 3-dimensional lattice structure of the body. In many preferred embodiments of the invention, the bodies have a density of at least about 0.01 $g/cm^3$, and preferably at least 0.02 $g/cm^3$.

The novel porous bodies of this invention also have excellent surface area characteristics, which can play a substantial factor in the utility of porous bodies and articles formed therefrom. For example, their high exposed surface area, higher than that of other available materials, is available for attachment or adsorption of active agents and the like. An increase in surface area per unit weight of a material often minimizes the amount of material needed to perform a desired function. For example, the ability of a given amount of a material to perform as an adsorbent can be viewed as a function of the amount of adsorption per unit weight of the material. The more surface area per unit weight, the better the material will function as an adsorbent.

The present porous open-celled 3-dimensional lattice bodies have a surface area of at least about 30 $m^2/g$, preferably at least about 50 $m^2/g$, and more preferably at least about 100 $m^2/g$. In particularly preferred embodiments, the surface area is at least about 150 $m^2/g$, more preferably at least about 200 $m^2/g$, and most preferably at least about 300 $m^2/g$.

The open-celled nature of the porous bodies of this invention can be further characterized in part by pore volume and pore diameter.

The present porous bodies have a pore volume of at least about 1 $cm^3/g$, preferably at least about 1.5 $cm^3/g$, and more preferably at least about 2.0 $cm^3/g$. In particularly preferred embodiments, the pore volume is at least about 2.5 $cm^3/g$, more preferably at least about 3.0 $cm^3/g$, and most preferably at least about 4.0 $cm^3/g$.

The pore diameter can vary substantially to achieve a given pore volume. Generally, the open-celled lattice structure of the porous bodies have an average pore diameter of at least about 50 Angstroms (Å). In preferred embodiments, the average pore diameter is at least about 100 Å, and more preferably at least about 200 Å. In particularly preferred embodiments, the average pore diameter is at least about 250 Å, preferably at least about 300 Å, and most preferably at least about 350 Å. In alternatively preferred embodiments, the average pore diameter ranges from about 50° Å to about 500 Å.

In alternative embodiments of the invention, the average pore diameter of the porous bodies can be varied to accommodate specific applications or screen different materials. For example, in preferred embodiments of the invention one can use articles having an average pore diameter of about 150 to 400 Å to entrap or immobilize a specific molecule such as an enzyme within the pores of a shaped body. For other applications, such as forming insulation materials from materials of this invention, a relatively small pore (10 to 150 Å) may be desired. For applications in which rapid diffusion is important, a relatively large pore diameter may be desired.

One method for controlling the average pore diameter of the present porous bodies involves changing their density as discussed further below. It is important to note that with decreasing density of the porous bodies, their average pore diameter tends to increase. Alternatively, the pore diameter can be controlled by employing a "ghost" mold or imprint technique. The "ghost mold" or imprint technique involves adding to the gel a material (prior to, during, or after gelation) which can later be removed from the gelled material. The ghost material leaves voids when removed. It can be removed by conventional techniques known in the art, such as dissolution or chemical etching.

In spite of their relatively low density, the bodies and articles formed therefrom possess beneficial strength characteristics. The crosslinked, open-celled 3-dimensional lattice structure is believed to provide much of the strength. The porous bodies have a compressive strength such that the body does not fall apart or collapse when subjected to pressure. The porous bodies of this invention have a relatively low yield. Compressive yield corresponds to the stress-strain curve for a given amount of pressure applied to a material of known dimensions. This curve reflects the amount of compression resulting from the applied pressure. See Sibilia's *A Guide to Materials Characterization and Chemical Analysis* VCM Publishers 1988, 273–275.

The porous bodies of the present invention have compressive strength equal to or less than 75% yield at 300 psi, preferably equal to or less than 50% yield at 300 psi, more preferably equal to or less than 25% yield at 300 psi, and most preferably equal to or less than about 10% yield at 300 psi. In alternative embodiments, the compressive strength is equal to or less than about 10% yield at 1000 psi.

The polymers suitable for the present invention are hydroxyl group-containing natural and synthetic polymers and other synthetic polymers that form hydrogels when solubilized in water or other aqueous solvents, such as aqueous acid or base solutions, and mixtures of water and organic solvents.

Suitable hydroxyl group-containing polymers include natural polymers such as polysaccharides, e.g. alginates, gums, carrageenan, starch, dextrins, chitosan and agar, proteins, e.g. gelatins, casein and collagen; synthetic polymers, e.g. polyvinyl alcohols, vinyl alcohol copolymers and starch/acrylate copolymers; and mixtures and copolymers thereof. Alginate is general name give to alginic acid and its salts. Alginates are composed of D-mannosyluronic acid and L-gluopyranosyluronic acid residues, and are commercially harvested from seaweeds. Illustrative of suitable alginates are the alkali metal salts of alginic acid, and most preferred is sodium alginate. Gums are polysaccharides extracted from plants, and illustrative of suitable gums are guar gum and locust bean gum. Carrageenan is a colloid extracted from carrageen, and dextrins are polymers of D-glucose. Illustrative of suitable vinyl alcohol polymers are saponified polyvinyl acetate, preferably, having at least about 70 mol % of the acetate group hydrolyzed to be easily soluble in water, and suitable vinyl alcohol copolymers include vinyl alcohol/ ethylenimine copolymers and vinyl alcohol/acrylate copolymers.

Other synthetic hydrogel polymers suitable for the present invention include acrylate polymers, polyalkylene amides, polyalkylenimides, polyacrylamides, and mixtures and copolymers thereof. Illustrative of suitable acrylate polymers are monovalent, e.g. $Na^+$, $K^+$, $Li^+$, $Cs^+$, or divalent, e.g. $Mg^{+2}$, $Ca^{+2}$, $Sr^{+2}$, $Ba^{+2}$, $Cu^{+2}$, $Cs^{+2}$, $Pb^{+2}$, $Zn^{+2}$, $Fe^{+2}$, $Ni^{+2}$, metal salts of polymers derived from acrylic acid, methacrylic acid, methyl methacrylic acid, ethyl methacrylic acid; and polymers derived from hydroxylethyl methacrylate, hydroxyethoxyethyl methacryalte, methoxyethyl methacrylate, methoxyethocyethyl methacryalte, aminoethyl methoacryalte propylene and glycol methacrylate. Suitable polyalkylenimides include polyethylenimide and the like.

The starting concentration of the hydrogel polymer directly affects the density of the porous bodies. As the concentration of the polymer in the solution increases, the density of the porous body increases. An effective amount of gel-forming polymer is used. An "effective" amount is in the range of polymer concentrations between the minimum concentration which is high enough to form a gel and the maximum concentration which is low enough to be completely soluble in a gelling solvent. The effective amount of each polymer will vary with the selected density of the porous body. In general, the suitable concentration of the polymer for the present invention is between about 0.02% to about 15%, preferably between about 0.5% to about 12%, and more preferably between about 1% to about 10%.

In order to set or coagulate the polymer solution, hereinafter sometimes also referred to as "pregel", it may be necessary to utilize a gelling agent. Some gel-forming polymers do not require gelling agent, as discussed further below. In general, the polymer solution is exposed to an aqueous solution of an effective amount of gelling agent. The effective amount as used in this connection is the amount of gelling agent which is sufficient to set or coagulate the polymer solution such that its shape is maintained. Appropriate kinds and amounts of gelling agent will depend on the polymer. The gelling agents are well known in the art, and each gel can be prepared by conventional techniques known in the art.

Gelling of the polymer solution takes place over time. The amount of time required depends on the diffusion rate of the gelling agent. The gel's viscosity, which depends on the polymer concentration, generally dictates the length of time needed for the movement of the gelling agent throughout the gel. The higher the concentration of polymer, the longer the required diffusion time. Gelling may also involve a molecular rearrangement of the polymer. To some extent the rearrangement will occur simultaneously with the diffusion of the gelling agent through the gel, but it may also continue after complete diffusion of the gelling agent. It is believed that without diffusion of the gelling agent throughout the gel, shrinkage or collapse of the gel can occur during the downstream process steps of forming the porous bodies. With the onset of shrinkage, density may increase (as surface area decreases) to a point above a desired level.

The selection of gelling agent depends on the polymer utilized. The gelling agent can be any agent which is reactive with the polymer to set or coagulate the pregel. For alginate, an inorganic or organic cationic material is used to ionically bond the carboxylic acid moieties of the alginate polymer strands. Dicationic or polycationic materials are preferred for their ability to ionically bond the carboxylic acid moieties of two adjacent polymer strands. Sodium alginate can also be gelled using organic acids or inorganic materials, such as di- or polycationic metals. The organic acids used for gelling alginate, sodium alginate, can vary widely. Illustrative of such acids are acetic acid, propanoic acid, butanoic acid, benzoic acid, oxalic acid, malonic acid, succinic acid adipic acid, glutaric acid, maleic acid, phthalic acids and derivatives thereof. Preferably, a dicationic metal or dicarboxylic acid is employed in order to link two strands of the polymer together. Suitable cationic ions include ionic forms of and of the following: Al, Ba, Ca, Mg, Sr, Cr, Cu, Fe, Mn, and Zn. Most of the transition metals in the cationic form of $X^{2+}$ or more can also be employed. Preferably, the cationic metal is a cationic form of Ca, Ba or Cu.

For gums, gelling agents including sodium borate, inorganic acids, organic acids, such as boric acid, and bases are suitable.

Other polymers such as agar, carrageenan, gelatins and casein do not require any additional gelling agent, since they can be gelled by a heat treatment. The pregel solution is heated to a temperature high enough to melt the polymers, followed by cooling to form a gel. For example, an aqueous agar solution will form a gel upon heating to at least 80° C. and followed by cooling until gelation occurs.

Polyvinyl alcohol and starch/acrylate copolymers also do not require any agents or additional processes to form gels. They form gels when their aqueous solutions are exposed to an appropriate crosslinking solvent, such as acetone.

Rapid cooling is an alternative to using a gelling agent. This process may be used in addition to treatment with gelling agent or any other gelling technique. The rapid cooling technique involves forming a pregel or gel and dropping the pregel or gel into a solvent bath which has been cooled to a temperature at which the gelling solvent does not freeze, but at which the polymer coagulates. For hydrogel materials, generally, water alone is not suitable as a gelling solvent for the rapid cooling technique since water will freeze and will not diffuse out. Hence, a water/organic solvent mixture is used. In the case of alginate, a water/ ethylene glycol (having at least about 25% ethylene glycol or organic solvent) can be used as the gelling solvent. The pregel or gel is then placed in a cooled bath of acetone, which then replaces the water/ethylene glycol solvent.

The gels can be fabricated into any desired shape. Shaping may be carried out by any conventional method known in the art. A polymer solution can be placed in a mold of any desired shape and then gelled in the mold. For example, a layer of a polymer solution can be placed on a flat surface to form a sheet; a polymer solution can be expressed through an aperture to form a filament fiber or tube, or it can be dripped into a gelling solvent to form granules. Any desired configuration (tubes, cubes, rectangular shapes, sphere, such as beads, pellets, sheets, which may be in the form of membrane) can thus be obtained.

In accordance with the present invention, the set or coagulated gels are further subjected to a crosslinking process to increase their physical strength and to preserve the porous structure of the gels.

The gels are prepared for crosslinking by replacing the initial gelling solvent, i.e., water, with a crosslinking solvent. The gelling solvent can be replaced directly with a crosslinking solvent. Alternatively, if the crosslinking solvent is not miscible with the gelling solvent, one or more of intermediate solvents may be utilized. A suitable intermediate solvent is miscible with both gelling solvent and crosslinking solvent. The crosslinking solvent should also be non-reactive with the polymer and the crosslinking agent.

In general, the surface tension of the crosslinking solvent can be less than, greater than or equal to the surface tension of the gelling solvent. Preferably, the crosslinking solvent has a surface tension substantially equal to the gelling solvent. This would obviate the necessity for solvent exchanges over a concentration gradient as discussed, infra. In alternative embodiments, the crosslinking solvent has a surface tension which is less than the gelling solvent. In such embodiments, the crosslinking solvent may have a surface tension which is less than or greater than that of the intermediate solvent. In more preferred embodiments, the crosslinking solvent has a surface tension which is less than about 75 dynes/cm. In further preferred embodiments, the crosslinking agent has a surface tension equal to or less than about 50 dynes/cm. In particularly preferred embodiments, the crosslinking solvent has a surface tension equal to or less than 40 dynes/cm. In more particularly preferred embodiments, the crosslinking solvent has a surface tension equal to or less than about 30 dynes/cm.

Illustrative of solvents useful for the present invention are acetone, chloroform, dimethyl sulfoxide, toluene, pyridine and xylene. In many of the preferred embodiments, the crosslinking solvent is an aprotic organic solvent.

In general, the gelling solvent should be substantially, if not completely, removed from the gel prior to crosslinking if the selected crosslinking agent is reactive with the gelling solvent, as the reaction between the gelling solvent and crosslinking agent tends to diminish the crosslinks. For example, the water in a hydrogel polymer will react with a crosslinking agent such as tolylene diisocyanate (TDI). Replacement of the gelling solvent with a crosslinking solvent is generally referred to herein as a solvent exchange step. The actual exchange to the crosslinking solvent from the initial gelling solvent may comprise one or more exchanges of the gelling solvent with an intermediate solvent or solvents prior to replacing the intermediate solvent with the crosslinking solvent.

Preferably, the solvent exchange process comprises replacing the initial gelling solvent with an intermediate solvent of low surface tension, e.g. acetone. The intermediate solvent is selected such that is miscible with both the gelling solvent and with the subsequent intermediate solvent or the crosslinking solvent. Preferably, the intermediate solvent has a surface tension which is lower than that of the gelling solvent. In more preferred embodiments the intermediate solvent has a surface tension of less than 75 dynes/cm. In further preferred embodiments, the intermediate solvent has a surface tension equal to or less than about 50 dynes/cm. In particularly preferred embodiments, the intermediate solvent has a surface tension equal to or less than about 40 dynes/cm. In more particularly preferred embodiments, the intermediate solvent has a surface tension which is equal to or less than about 30 dynes/cm.

It is noted that if the crosslinking solvent has a surface tension greater than that of the gelling solvent and an intermediate solvent is used, then the intermediate solvent preferably has a surface tension which is less than the surface tension of the crosslinking solvent and greater than the surface tension of the gelling solvent.

If more than one intermediate solvent is used, then the intermediate solvent need only be miscible with the prior and subsequently used solvents. For example, water can first be exchanged with acetone, which is miscible both with water and with a subsequent crosslinking solvent such as toluene. Acetone is one of the preferred intermediate solvents for several reasons. Acetone is readily available and is relatively innocuous; it is also soluble in water and toluene. Other suitable intermediate solvents which may be used include alcohols, e.g. methanol, ethanol, propanol and butanol; esters, e.g. methyl and ethyl acetate; ketones, e.g. methyl ethyl ketone; and others such as dimethyl sulfoxide, dimethylformamide, methylene chloride, ethylene chloride, tetrahydrofuran, dioxane, and the like.

As is known in the art, the pores of porous gels derived from hydrogel polymers collapse to form dense solids having a limited porosity when the gelling solvent is removed, i.e., when dehydrated. In addition, it has been found that when the gelling solvent is abruptly replaced with a crosslinking solvent having substantially different surface tension and polar characteristic, a large portion of the pores of the gels, especially fine pores, collapse to form less porous gels. The collapse of the pores not only significantly decreases the surface area and increase the density of the porous bodies, but also reduced their dimensional stability and physical strength. The collapsed pores prevent access of the crosslinking agent, resulting in uncrosslinked portions in the gel, which are free to swell and shrink.

In order to maintain the porous gel structure without causing shrinkage or collapse of the gel upon removal of the gelling solvent, care must be taken when replacing the gelling solvent with an intermediate solvent. Often, the use of a number of gradual solvent exchanges may be beneficial, using the same intermediate solvent at increasing concentrations. Such solvent exchange is herein referred to as solvent exchange over a concentration gradient. The concentration gradient is used to stepwise decrease the surface tension of the liquid within the gel. An effective concentration gradient is an interval of changes in concentration of intermediate or crosslinking solvent which prevents significant collapse of the gel structure and avoids substantial shrinkage of the gel. In general, though not necessarily, at least one solvent exchange is performed; many of the preferred embodiments employ more than one solvent exchanges. Desirably, the number of steps used and the amount organic waste generated in each batch of exchanges should be minimized. Intermediate waste can be reused, redistilled or separated to recover the solvents. For each solvent exchange step, sufficient time should be allowed for the replacement solvent to reach equilibrium. Equilibrium is the point at which the concentration of the replacement solvent inside the gel is in equilibrium with the concentration of the replacement solvent at the outer surface of the gel.

The intermediate solvents are usually a mixture of the intermediate solvent and the gelling solvent until 100% intermediate solvent is exchanged. The initial concentration of intermediate solvent (or crosslinking solvent, if no intermediate solvent is used), may contain from about 5 to about 25 volume % of the intermediate solvent, and thereafter the solvent exchanges over the concentration gradient can take place in increasing intervals of 10 volume % or higher.

In preferred embodiments, the intermediate solvent is initially employed in a concentration ranging from about 10 to 25 volume % and the concentration is then stepped up in intervals of from about 15 to about 25 volume %. The incremental increases of from about 20 to about 25 volume % are particularly preferred to minimize the number of solvent exchanges.

Once a substantially complete exchange of intermediate solvent for the initial gelling solvent has taken place, the intermediate solvent can generally be exposed directly to 100% of the crosslinking solvent. Although it is theorized that for most hydrogel polymers no gradient is required for the exchange from the intermediate solvent to the crosslinking solvent, there may be a situation where a concentration gradient is used for the exchange of an intermediate solvent and a crosslinking solvent.

Other techniques may be used to prepare the gel for crosslinking. These may be used in addition to or instead of the solvent exchange processes. Sometimes it may be preferable to perform at least one solvent exchange in connection with such techniques. Illustrative of such alternate techniques are freeze-drying and supercritical fluid extraction. Freeze-drying is advantageous since a solvent exchange procedure should not be necessary. On the other hand, a supercritical fluid extraction can also be beneficial since water can be exchanged by this method, with or without the need for intermediate solvent exchanges.

Freeze-drying is a well-known procedure which is frequently used in the food industry. The material to be freeze-dried is first cooled to below the freezing point of the solvent, followed by vacuum drying, as known in the art. The resulting freeze-dried hydrogel structure is directly placed in a crosslinking solvent to be crosslinked. Because the freeze drying process may not well preserve the porous gel structure, it may be necessary to add surfactants, elastomeric additives or polyols to the pregel composition to prevent the collapse of pores during the freeze-drying process.

Super-critical fluid extraction involves extractions of the gelling solvent or intermediate solvent at high pressure using supercritical $CO_2$ in the liquid phase. Supercritical $CO_2$ is non-polar and can replace the solvent present in the gel. When the pressure is released, the $CO_2$ evaporates from the porous material. This technique can be used in a fashion analogous to that which has been described for the preparation of inorganic aerogels.

Following freeze-drying or supercritical extraction, the dried material is exposed to a crosslinking agent, which can be provided in solution or in the gas phase, to form a crosslinked porous body. The solvent for the crosslinking agent can vary widely. Such a solvent or gas acts as a carrier vehicle for the crosslinking agent. Obviously, the carrier vehicle should be inert to the gel material and capable of solubilizing the crosslinking agent. The supercritical fluid extraction method may be a preferable procedure for making materials of very low density materials, i.e. less than about 0.05 g/cm$^3$.

The choice of crosslinking agent will vary with the polymer, and the amount of crosslinking agent will vary with the amount of polymer present in the gel and the amount of crosslinking desired. The crosslinking agent must be reactive with the functional groups present in the polymer. The polymers suitable for use in the present invention have a variety of functional groups such as —OOH, —OSO$_3$ and —NH$_2$ on their polymer backbone, as well as hydroxyl functional group. Of these groups, the hydroxyl group is preferably targeted for the crosslinking process. The degree of crosslinkage can be varied to suit the needs of each application. The novel gradient solvent exchange process of the present invention that prevents the collapse of the gel pores can facilitate up to 100% crosslinking of all available functional groups present on the surface of the porous gels. The porous bodies of the present invention that are highly crosslinked exhibit high dimensional stability, minimal swellability and excellent chemical integrity even when exposed to different solvents. Preferably, up to 75% of the functional groups of the hydrogel polymer are crosslinked; more preferably, up to 85% are crosslinked; and most preferably, up to 100% of at least one functional group of the hydrogel polymer is crosslinked. Since, as is known in the art, the maximum molar concentration of available functionalities can be empirically calculated for a given starting concentration of each selected polymer, the approximate amount of crosslinking agent needed to accomplish the desired level of crosslinkage can easily be determined.

A large number of well-known chemical crosslinking agents are available for use in the crosslinking step. Illustrative of suitable crosslinking agents are diamines and polyamines that crosslink the hydroxyl and/or carboxylic moieties along the hydrogel polymer backbone. For the purposes of this invention, diisocyanate compounds are preferred. The diisocyanate compounds can be aliphatic, cycloaliphatic or aromatic. Aromatic diisocyanates, such as 2,4-tolylene diisocyanate, 4,4-diphenylmethane diisocyanate, and 14-phenylene diisocyanate, are examplary of preferred embodiments. Other suitable agents for crosslinking the hydroxyl moiety include, for example, diacid halides, such as halide salts of adipic acid, glutaric acid or succinic acid, diepoxides, epichlorohydrin, aldehydes, dialdehydes, trimetaphosphates, vinyl sulfones, trimethylolmelamine, melamine-formaldehyde, urea-formldehyde systems and di-halogenated aliphatics. Specific examples of such compounds include bis(hydroxymethyl)ethylene urea, N,N'-methylenebisacrylamide, and 1,3,5-trichloro- and 1,3,5-triacryl s-triazine.

The crosslinking process takes place over time, and the amount of time required for crosslinking depends on the diffusion of the crosslinking agent throughout the gel. The crosslinking process may be conducted at any temperature above the freezing point and below the boiling point of the crosslinking solvent. Preferably, the crosslinking process is conducted at an elevated temperature below the boiling point of the crosslinking solvent in order to expedite the process.

Upon completion of the crosslinking process, the crosslinking solvent is removed form the gel bodies by a variety of conventional techniques, such as draining the liquid from the solid crosslinked product. Evaporation under vacuum is another suitable technique. Suitably, the solid crosslinked material is then dried under reduced pressure at a temperature of at least 20° C. evaporate leftover solvents or volatile crosslinking agents from the crosslinked gel bodies.

The present porous bodies exhibit numerous beneficial properties including low density and high surface area as well as high pore volume and excellent strength characteristics. In addition, the porous bodies have excellent dimensional stability even after thorough dehydration and rehydration, especially at high levels of crosslinkage in such levels that are not possible to accomplish using the prior art solvent exchange processes. The numerous beneficial properties of the bodies provide a material with many uses, such as active-agent support materials, fillers, absorbents, adsorbents, filters, fibers, membranes and many other applications.

A principal advantage of the porous bodies of this invention and articles formed therefrom is the diversity of chemical modification which can be performed on the gelforming prior to, during or after isolating the open-celled porous cross-linked body. The above-mentioned functional groups present in polymers suitable for use in the present invention can be chemically modified by employing conventional procedures. The number of functional groups available for chemical modification depends on the number of functional groups which have been involved in the crosslinking. With less crosslinking, more functional groups will be available for chemical modification. Alginic acid contains a substantial number of carboxyl groups, for example, which are easily derivatized by numerous reagents. Even if one crosslinks these materials using hydroxyl-specific reagents such as diisocyanates, sufficient free hydroxyls can survive the process intact and should be accessible for further reaction.

The numerous modifications which can be performed on the functional groups of a hydrogel polymer make the range of applications for the porous bodies and articles of this invention almost endless. Suitable uses include storage and transport of chemicals; support applications, e.g. catalytic reactions or filter media; and insulation and separation applications.

The following examples are merely illustrative of our invention and should not be considered limiting in any way.

PROCEDURES FOR MEASURING PROPERTIES OF THE MATERIALS

Surface areas were determined by nitrogen adsorption. Samples were first degassed for 16 hours in a helium atmosphere at 50° C. Adsorption/desorption measurements were made on a Quantasorb sorption systems, a continuous flow gas chromatographic instrument, manufactured by Quantachrome Corp., Syosset, N.Y. Values reported are based on single point measurements at liquid nitrogen temperature, 78K., and 0.3 partial pressure of nitrogen in helium with a total flow rate of 20 cm$^3$/min. The surface areas were calculated using the BET (Brunauer, Emmett and Teller) isotherm following the procedure recommended by the equipment manufacturer.

The particle bulk density, pore volume and average pore diameter were determined by mercury porosimetry. Samples were first degassed for 16 hours in a helium atmosphere at 50° C. Measurements were made on a Autopore 9210 mercury porosimeter manufactured by Micromeretics, Norcross, Ga. Measurements were taken over the pressure range 20 to 60,000 lb/in$^2$ (138,000 to 410,000,000 Pa) at 60 points with roughly equal logarithmical spacing, are converted to pore diameters via the Washburn equation where the surface tension of mercury, 485 dyne/cm, and the contact angle, 140°, are assumed. The corresponding pore diameters go from 10 μm to 3.6 nm. The particle bulk density is measured at 20 lb/in$^2$ (138,000 Pa), and the apparent bulk density is calculated by measuring the volume of a known weight of packed granules having a size range between about 20 and about 40 mesh. The pore volume includes those pores filled as the pressure changes over the range of the experiment. The average pore diameter is defined as four times the ratio of the pore volume to the total pore area, where the pore surface for pores of a given diameter is calculated from the incremental pore volume assuming cylindrical shape. Procedures followed for operation and analysis were those recommended by the manufacturer of the porosimeter.

The procedure used for the determination of compressive properties of the crosslinked materials was in accordance with the ASTMD 1621-73 testing procedure.

EXAMPLE 1

1. Preparation of a Porous Body (Matrix) from Crosslinked Alginate

Five grams of sodium alginate were added to 100 ml distilled water to yield a 5% solution. After addition of the sodium alginate, the solution was allowed to hydrate for 16 hrs. The fully hydrated polymer was then centrifuged to eliminate air bubbles. The viscous solution was exposed to a 0.2M calcium chloride solution to set or coagulate into a gel. Following completion of the setting step, the gel was cut into cubes of about 1 cc volume and then calcium alginate cubes were then washed thoroughly in water to remove excess calcium chloride and the calcium alginate cubes were exposed to a solution comprised of 25% acetone in distilled water (v/v). After equilibration, the 25% acetone water solution was decanted and replaced with a 50% acetone/water solution. The 50% acetone/water solution was decanted after equilibration and replaced with 75% acetone/water. Following equilibration in this solvent mixture, the solvent mixture was replaced with 100% acetone. The cubes were then equilibrated in 100% toluene, and crosslinked by the addition of 3.3 ml of 2,4-tolylene diisocyanate (TDI). Triethylamine was added as a base catalyst. The solution was heated to 100°–110° C., and allowed to react for about 16 hrs. Following crosslinking, the material was washed in fresh toluene and dried in a vacuum oven. The following table lists various physical properties of the final product.

| PROPERTIES OF THE CROSSLINKED ALGINATE | |
|---|---|
| Apparent Bulk Density | 0.164 g/cm$^3$ |
| Surface Area | 380 m$^2$/g |
| Pore Volume | 2.97 cc/g |
| Average Pore Diameter | 365 Angstroms |
| Compressibility | 10% yield at 347 psi |

COMPARATIVE EXAMPLE 1

Preparation of the Uncrosslinked Porous Bodies

A) Alginate:

Five grams of sodium alginate were added to 100 ml distilled water to yield a 5% solution. After addition of the sodium alginate, the solution was allowed to hydrate for 16 hrs. The fully hydrated polymer was then centrifuged at 2000 rpm for 30 minutes to eliminate air bubbles. The viscous solution was exposed to a 0.2M calcium chloride solution to set or coagulate into a porous gel. Following the completion of the setting procedure, the gel was cut into cubes of about 1 cm$^3$ volume and then the calcium alginate cubes were washed thoroughly in water to remove excess calcium chloride. The cubes were then freeze dried by transferring the pellets to freeze drying flasks, freezing at −20° C. and then lyophilizing for about 12 to 16 hours.

b) Agar:

Five grams of agar powder were added to 100 ml distilled water, and centrifuged as above to remove air bubbles. Then the aqueous solution was heated to about 90° C. until the agar was completely melted. The melted agar was cooled to room temperature to form a porous gel. The gel was then cut into cubes and freeze-dried as described above.

c) Carrageenan:

The procedure outline above for agar was repeated.

d) Guar Gum:

Five grams of guar gum powder were added to 100 ml distilled water, and the fully hydrated polymer was then centrifuged at 2000 rpm for 30 minutes to eliminate air bubbles. The viscous solution was then treated with 5% borax solution (w/v) and allowed to gel overnight. The gelled, porous gum was then cut into cubes and freeze-dried.

e) Locust Bean Gum:

The procedure outline above for guar gum was repeated. The freeze dried test specimens for the above examples were analyzed for their apparent bulk density (ABD) and surface area. The results are shown below.

| PROPERTIES OF UNCROSSLINKED POROUS BODIES | | |
|---|---|---|
| Sample | ABD (g/cm$^3$) | Surface Area (m$^2$/g) |
| Alginate | 0.243 | 20.7 |
| Guar Gum | 0.23 | 1.9 |
| Locust Gum | 0.15 | 2.8 |
| Agar | 0.09 | 4.6 |
| Carrageenan | 0.26 | 5.7 |

As can be seen from the ABD and surface area data of the uncrosslinked porous bodies, the uncrosslinked bodies have significantly smaller surface area and lower density than that of the crosslinked porous bodies prepared in accordance with the present invention, for example, the porous body of Example 1.

EXAMPLE 2

Optimization of The Solvent Exchange Procedure

Figure 2:
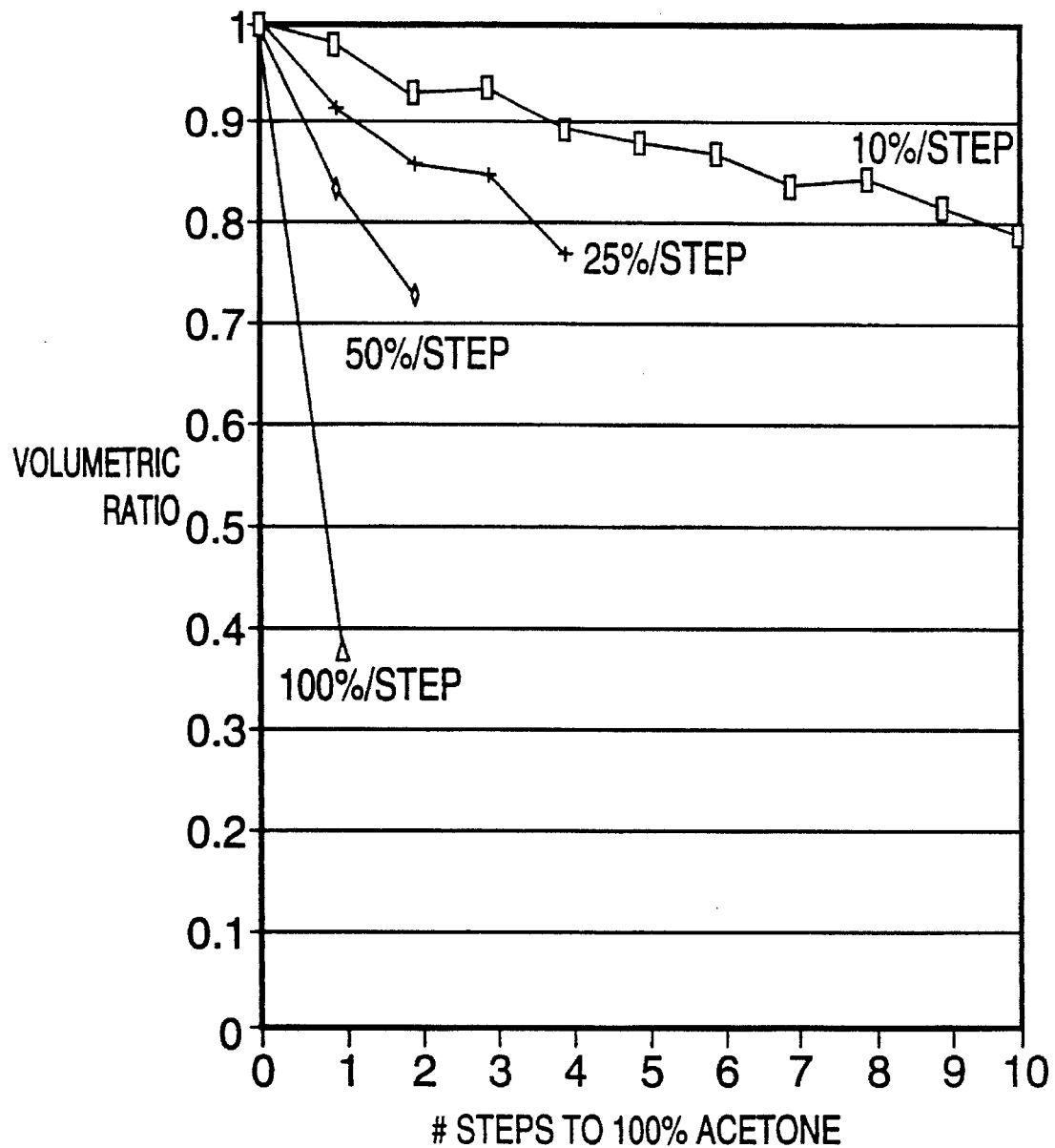
FIG. 2 is a graph of the results obtained in Example 2.

2% calcium alginate gels were prepared in accordance with the procedure outline in Example 1. The water in the gels was replaced with toluene, a crosslinking solvent, using acetone as an intermediate solvent. Prior to replacing the water with toluene or another crosslinking solvent, it is often advantageous to replace the water with an intermediate solvent which is aprotic and has a surface tension less than that of water and above that of the crosslinking solvent. It was observed that abrupt exposure of a gel to high acetone concentrations resulted in partial shrinkage of the gel, which should be avoided to maintain a low density material. In order to minimize the shrinkage of the gel, the maximum step-size increase in concentration of intermediate solvent was determined by making four crosslinked gels using different concentration gradients of the intermediate solvent. For one example, the water of the gel was replaced directly with pure acetone (100%). In the other three samples, concentration gradients of 10%, 25% and 50% were used. For each gradient, the concentration of acetone in the gel was increased incrementally to 100%, e.g. nine equal incremental steps from 10% acetone in water to reach 100% acetone in the gel. To assess gel shrinkage, the initial pellet diameters of a representative population were measured, and the pellets were then exposed to the next step up in acetone concentration. The pellet diameters were remeasured after a 15 minute equilibration period and the process was repeated until the pellets were in 100% acetone. Finally, the pellets were placed directly into 100% toluene (the crosslinking solvent), or washed further with fresh acetone before exposure to toluene. The results are shown in the FIG. 2, which demonstrates an unambiguous relationship between the concentration step-size and the gel shrinkage. Exposing the pellets directly to 100% acetone resulted in a volume reduction of greater than 60%. Taking the acetone concentration to 100% in two steps (50%/step) resulted in less than about than 25% shrinkage. About 24% shrinkage was observed in pellets taken to 100% acetone in four steps (25% step); whereas increasing the acetone to 100% in ten steps (10% each step) resulted in only about 20% shrinkage of the gel. The complete changeover to acetone, therefore, may be effected in as little as four incremental steps (25% acetone/water, 50% acetone/water, 75% acetone/water, 100% acetone). In addition, it was found that the pellets could be exposed directly to 100% toluene with little additional shrinkage once the pellets were solvent exchanged to 100% acetone.

EXAMPLE 3

Preparation of Ultra-Low Density Porous Body From Crosslinked Alginate

A 0.25% solution of sodium alginate was fully hydrated in 100 ml of distilled water. The hydrated solution (pregel) was then transferred to a syringe and centrifuged to eliminate air voids within the gel. The pre-gel was then introduce drop-wise into a solution of 0.2M calcium chloride, and the resulting pellets were allowed to coagulate. The calcium solution was then decanted, and the calcium alginate pellets were washed in a large excess of distilled water to remove excess calcium chloride solution. Following the wash step, the pellets were solvent exchanged to toluene and crosslinked with 2,4-TDI, following the procedure outlined in Example 1. The pellets were then freeze dried by transferring the pellets to freeze drying flasks, freezing at $-20°$ C. and then lyophilizing for about 12 to 16 hours. The density, surface area and pore characteristics were measured.

| PROPERTIES OF ULTRA-LOW DENSITY CROSSLINKED ALGINATE | |
|---|---|
| Apparent Bulk Density | 0.042 g/cm$^3$ |
| Surface Area | 200 m2/g |
| Pore Volume | 2.917 cc/g |
| Pore Area | 226 m2/g |
| Average Pore Diameter | 517 Angstroms |

EXAMPLE 4

Preparation of Crosslinked Alginate Using a Quick -Cooling Technique to Set The Initial Gel Fifty milligrams of sodium alginate were added to 10 ml of 58% ethylene glycol in water, and the mixture was allowed to gel. The fully hydrated gel was then extruded dropwise into 100 ml of precooled acetone ($-40°$ C., on dry ice). The rapid transition to this temperature caused the alginate gel to become rigid, but the gel did not freeze because of the ethylene glycol in the gel mixture. The extruded pellets were allowed to stir for about ½ hour in the cold acetone, and then the wet acetone was decanted and the pellets were transferred to a 100 ml pear-bottom flask containing 80 ml of pre-cooled, dry acetone, kept under nitrogen. The flask was allowed to warm to about 22° C. and then the gel was crosslinked with two additions of molar excess of 2,4-TDI. The final bulk density of the dried material was about 0.028 g/cm$^3$.

EXAMPLE 5

Preparation of Crosslinked Alginated Using Dilute Organic Acid as a Geling Agent A 2% sodium alginate solution (12 ml) was extruded dropwise into 200 ml of 10% acetic acid (v/v). The pellets were allowed to set overnight, washed with water to remove excess acetic acid, and then subjected to the solvent exchange and TDI crosslinking procedures described above. The pellets were freeze-dried overnight, as noted in Example4, and the final bulk density of the unground pellets was about 0.031 g/cm$^3$ Other organic acids capable of gelling the sodium alginate include adipic and formic; however, a simple mineral acid such as HCl had the opposite effect of substantially destroying the gel completely.

EXAMPLE 6

Figure 3:
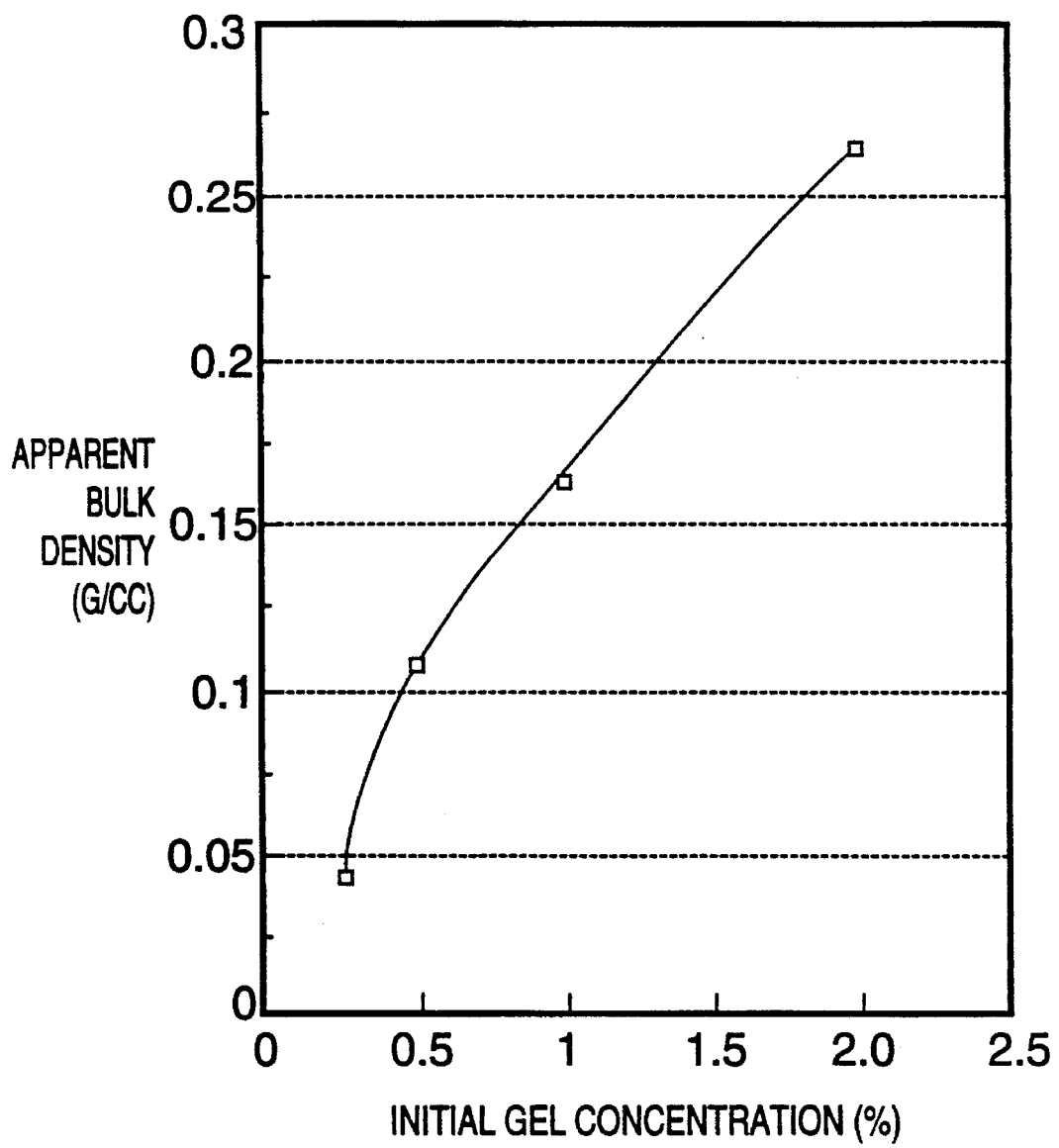
FIG. 3 is a graph of the results obtained in Example 6.

Effect of Initial Gel Concentration on The Final Density Gel Crosslinked Material The effect of the initial gel concentration on the final density of crosslinked material was determined by preparing a series of gels of increasing concentration, and comparing the densities of the final dried, crosslinked products. Gels were prepared with initial concentrations of 0.25%, 0.5%, 1.0% and 2.0% (w/v) were prepared. The gels were set as pellets by dropwise introduction into a solution of 0.2M CaCl$_2$, generally as described in Example 5. The calcium alginate pellets were then solvent exchanged and crosslinked with 2,4-TDI as described in Example 1. Following crosslinking, the reaction solution was decanted, and the pellets were dried. The dried materials were then ground to a particle size of less than about 20 mesh and the apparent bulk densities (ABD) were measured. As can be seen in FIG. 3, the final ABD of a given material was highly dependent upon the concentration of the starting gel from which it was made. The significance of these findings is that the final density of a material can be controlled by selecting an initial gel concentration which will yield the desired density.

EXAMPLE 7

Figure 4:
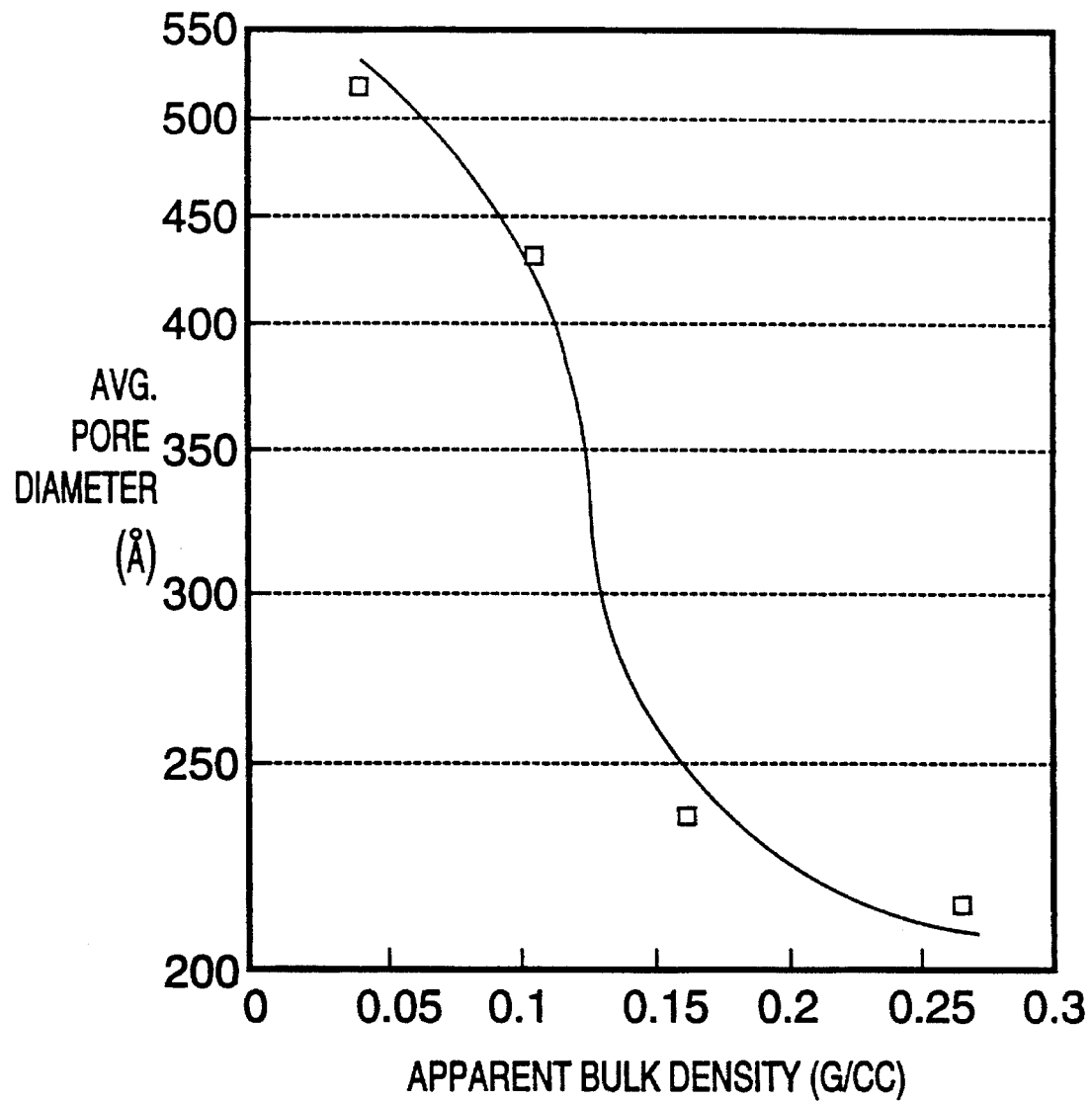
FIG. 4 is a graph of the results obtained in Example 7.

Relationship Between Density and Pore Size of the Porous Bodies Formed From Crosslinked Gels Mercury porosimetry was performed on the same four samples described in the preceding example. The intent was to determine whether or not a relationship existed between the final ABD of crosslinked alginate and the average pore diameter of the material. As can be seen in FIG. 4, such a relationship does exist. As the apparent bulk density decreases, the average pore diameter is seen to increase, within the ranges investigated. These results imply one would be able to, within limits, control the pore diameter of the final crosslinked material. For example, if a specific application requires pore diameters in the 200–300 angstrom range (ideal for immobilized enzyme supports), then one could process gels of the appropriate initial concentrations to yield a final product with a final density of about 0.15 g/cm$^3$ or greater.

EXAMPLE 8

Figure 5:
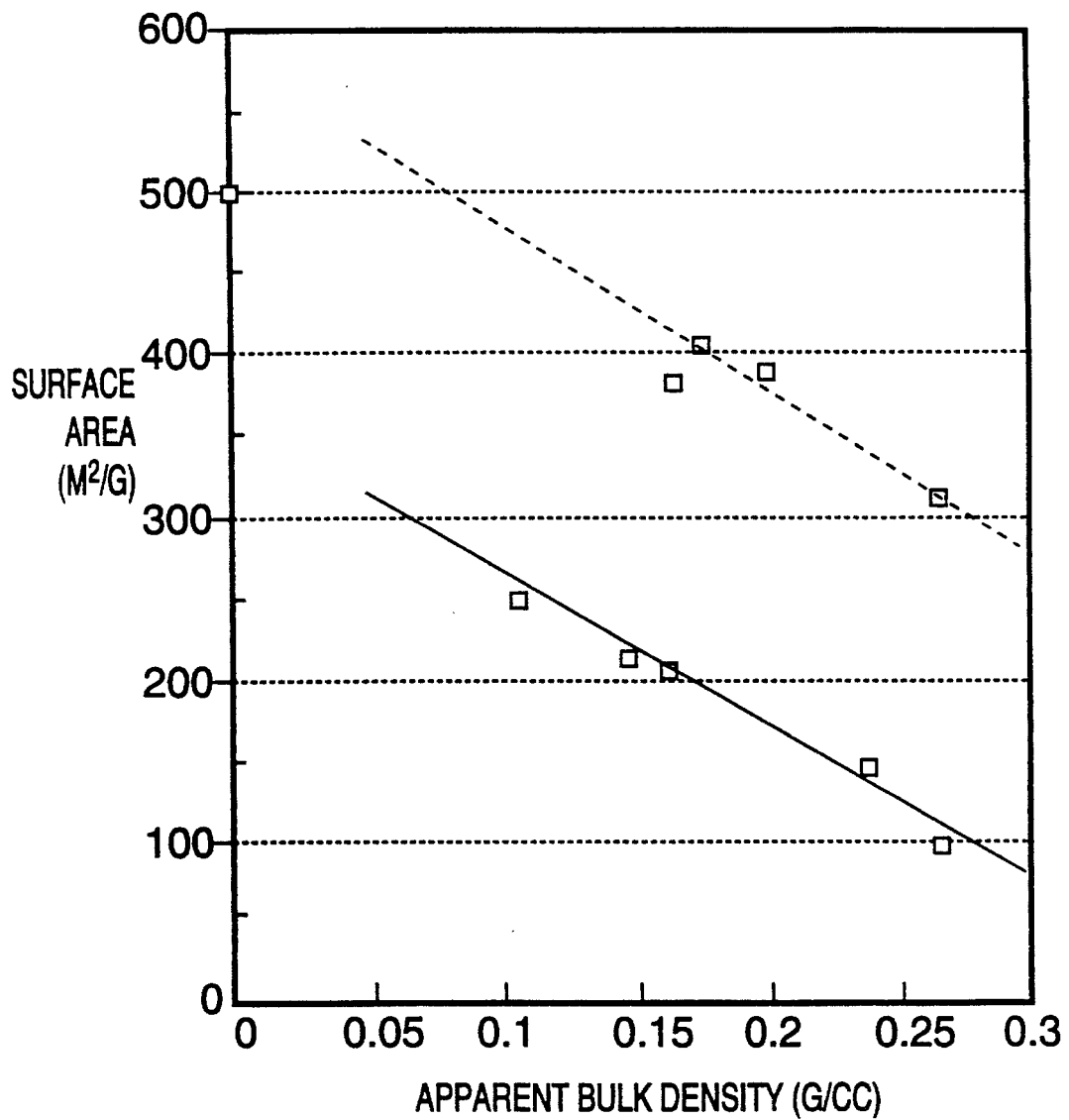
FIG. 5 is a graph of the results obtained in Example 8.

Relationship Between Density and Surface Area of Porous Bodies Formed From Crosslinked Biohydrogels The surface area of several crosslinked alginate samples of varying densities was measured in order to determine if there was a definable relationship between surface area and density. The data points arrayed along the two lines (solid and dashed) represent two families of materials which had different processing conditions. The samples along the solid (lower) line were processed as pellets, and were freeze-dried after crosslinking with 2,4-TDI. The data points along the dotted (upper) line were processed as cubes and were dried in a vacuum oven. As can be seen in FIG. 5, a relationship between ABD and surface area exists, indicating that by careful selection of the initial gel concentration and processing technique, the surface area of the present porous bodies can be controlled to have desired ranges.

EXAMPLE 9

Naturally Hydrogel Polymers

Figure 6:
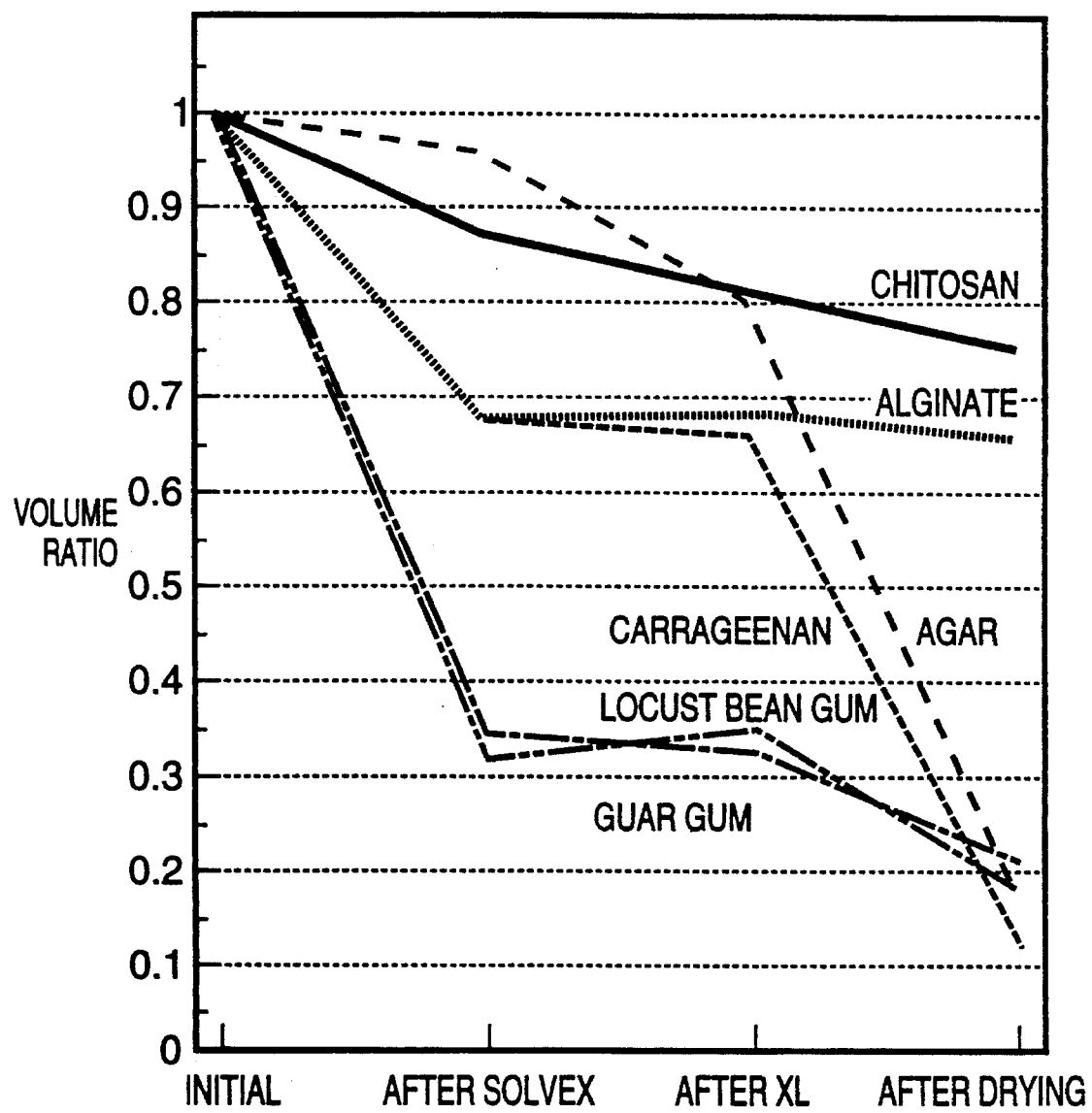
FIG. 6 is a graph of the results obtained in Example 9.

Various naturally-derived hydrogels were tested for their ability to form low-density crosslinked materials. The following materials were tested; Sodium Alginate, Chitosan, Agar, Carrageenan, Locust Bean Gum, Guar Gum, Gum Arabic, Gum Ghatti, Pectin, Tragacanth, and Xanthan Gum. Dissolving Gums Arabic, Ghatti, Tragacanth and Xanthan in distilled water resulted in the formation viscous solutions, but no good gelling procedure was found for any of them. Pectin was gelled using the following procedure: To 100 ml distilled water was added 5 g of pectin, 3 g of CaCl$_2$, and 0.2 g of citric acid. The mixture was heated slowly to 80° C., and allowed to cool to room temperature. The pectin gel that resulted was not sufficiently strong to be useful. 5% Na-alginate solution was set in 0.2M CaCl2, and 5% chitosan was gelled in dilute acetic acid (Ca. 4% w/w) and then set in 10% NaOH (w/w). 5% mixtures of agar in water and carrageen in water were heated to about 100° C., and then allowed to cool to set into a stiff gels. 5% solutions of guar and locust bean gum were prepared, and then set with sodium borate solution. Following gelling, the gels were sliced into cubes of approximately 1 cc$^3$ volume. The cubes were then subjected to the solvent exchange and crosslinking procedures described in Example 1, and then dried. To assess the utility, of the various materials, their net shrinkage was measured. Shrinkage was used as a criterion, since as the materials shrink they densify. Therefore, the dimensions of a statistically representative population of the starting cubes (n=5) were measured using a micrometer, and the dimensions were remeasured after the solvent exchange procedure, after the crosslinking procedure, and after the final drying. As can be seen in FIG. 6, the chitosan and sodium alginate show superior properties. The agar and carrageenan displayed minimal shrinkage during the solvent exchange procedure. However, upon drying, these two collapsed to a fraction of their initial volumes. The locust bean and guar gum samples collapsed with the initial solvent exchange procedure. The fact that the agar and carrageenan did not collapse during the solvent exchange procedure also makes them viable candidates for other crosslinking procedures.

COMPARATIVE EXAMPLE 2

Using the chitosan crosslinking procedure disclosed in Kokai Patent Publication No. 133143-1986, "Heavy Metal Adsorbing Agent", a sample was prepared.

A material was prepared as described in example 1 of this publication. Shrinkage of the material produced using their protocol was used as a guide to assess collapse of the material. The degree of collapse of their material was compared to those values obtained using our procedures in order to determine the relative performance of the two procedures.

Chitosan, was mixed with dilute acid, such as formic or acetic, makes a gel and then placed in a solution of sodium hydroxide, which coagulates the chitosan to form an opaque, friable material. The coagulated chitosan pellets are placed directly into acetone, and after washing with fresh acetone, added 2,4-tolylene diisocyanate to effect the crosslinking. The chitosan pellets shrank during the initial exposure to acetone. The initial diameters of 20 pellets were measured using a micrometer, and the pellets were remeasured after drying the pellets. The pellets went from an average initial diameter of 2.27 mm to only 1.457 mm after drying, a loss of 57.5% in diameter. Using the procedure of our Example 1 procedure, however, the loss was only about 3.3%.

EXAMPLE 10

Crosslinked Gelatin Matrix

Five grams of gelatin (275 bloom*) were mixed with 100 ml of distilled water and heated to 90°–100° C. with stirring. Upon complete dissolution of the granular gelatin, the solution was allowed to cool to room temperature, thus gelling the proteinaceous material. The gel was then sliced into cubes of approximately 1 cc volume, transferred to a 250 ml round-bottom flask and then subjected to the solvent exchange and crosslinking procedure as described in EXAMPLE 1. The crosslinked product was then washed with fresh toluene, dried in a vacuum oven, and ground to a powder (less than 40 mesh). The table below lists the physical properties of the final material.

* -See Mantell Thomas C. L., *Water-Soluble Gums*, Reinhold Publishing Co. (New York), 1947, pp. 174 and 209.

| PROPERTIES OF CROSSLINKED GELATIN | |
|---|---|
| Apparent Bulk Density | 0.119 g/cm$^3$ |
| Surface Area | 110 m$^2$/g |
| Pore Volume | 1.31 cm$^3$/g |
| Pore Area | 151 m$^2$/g |
| Average Pore Diameter | 350 Angstroms |

EXAMPLES 11

Starch/Acrylate Copolymer Gel 10 g of Sanwet®, a starch gratfted sodium polyacrylate polymer, available from Hoechst-Celanese, was dissolved in 200 ml of distilled water. 100 ml of the solution was added to 500 ml of 50% acetone in water at room temperature, resulting in a coagulated sponge-like gel. After 2 hours, the 50% acetone was decanted and 75% acetone was added, and then the same process was repeated for 100% acetone. After 1 hour, the gel was broken up with a spatula and the acetone was decanted. The resulting gel is placed in a round bottom flask and 500 ml of fresh 100% acetone was added. Again, after 2 hours the acetone was replace with fresh 100% acetone. 1 hour thereafter, the acetone was decanted and replaced with 100% toluene. The toluene was replaced with fresh 100% toluene in 1 hour, and this process was repeated one more time.

The fully solvent exchanged gel suspended in toluene was slowly heated to 80° C. 100 μl of TEA was added and a condenser was place on the flask. 10 minutes later 5.93 ml of TDI added and undisturbed for 3 days. The resulting crosslinked gel was collected and dried in a vacuum oven for 5 hours. The crosslinked, dried gel was determined to have an apparent bulk density of 0,349 g/cm$^3$.

EXAMPLE 12

Synthetic Hydrogel Polymer Gels

Crosslinked porous bodies of synthetic hydrogel polymers, including polyvinyl alcohol, polyethyleneimine, vinylalcohol/ethylenimine copolymers, acrylate polymers, are prepared. The polymers are dissolved in water, gelled and crosslinked by following the procedures outlined in Example 11. The resulting crosslinked bodies have an apparent bulk density of less than 1.0 g/cm$^3$.

What is claimed is:

1. A process for making a crosslinked, highly porous body comprising the steps of:

a) dissolving a hydrogel polymer in a gelling solvent, said hydrogel polymer selected from the group consisting of alginates, gums, starch, dextrins, agar, gelatins, casein, collagen, polyvinyl alcohol, polyethylenimine, acrylate polymers, starch/acrylate copolymers, and mixtures and copolymers thereof, b) forming a gel from the dissolved polymer solution into a desired configuration, c) gradually replacing said gelling solvent with a crosslinking solvent by employing a concentration gradient solvent exchange process, d) adding a crosslinking agent to crosslink said gel, and e) isolating the crosslinked gel from said crosslinking solvent, wherein said porous body is characterized in that it has an open-celled 3-dimensional lattice structure, a density of less than about 1.0 g/cm$^3$, a surface area of equal to or greater than about 30 m$^2$/g, and a compression strength of equal to or less than about 75% yield at 300 psi.

2. The process of claim 1, wherein said hydrogel polymer is selected from the group consisting of alginates, gums, dextrins, agar, gelatins, casein, collagen, polyvinyl alcohol, starch/acrylate copolymers, and mixtures thereof.

3. The process of claim 1, wherein said crosslinking solvent is selected from the group consisting of acetone, chloroform, dimethyl sulfoxide, toluene, pyridine, and xylene.

4. The process of claim 1, wherein said concentration gradient solvent exchange process utilizes an intermediate solvent that is miscible to both said gelling solvent and said crosslinking solvent.

5. The process of claim 1, wherein said intermediate solvent is selected from the group consisting of alcohols, acetates, ketones, DMSO, DMF, methylene chloride, ethylene chloride, tetrahydrofuran, and dioxane.

6. The porous body of claim 1, wherein said crosslinking agent selected from the group consisting of diisocyanates, diacid halides, diepoxides, epichlorohydrin, aldehydes, dialdehydes, trimetaphosphates, vinyl sulfones, urea-formaldehydes and di-halogenated aliphatics.

7. A process for making a crosslinked, highly porous body comprising the steps of:
   a) dissolving a hydrogel polymer in a gelling solvent that contains an additive selected from the group consisting of surfactants, elastomeric additives, and polyols, said hydrogel polymer selected from the group consisting of alginates, gums, starch, dextrins, agar, gelatins, casein, collagen, polyvinyl alcohol, polyethylenimine, acrylate polymers, starch/acrylate copolymers, and mixtures and copolymers thereof,
   b) forming a gel from the dissolved polymer solution into a desired configuration,
   c) freeze-drying said gel,
   d) adding a crosslinking solvent to the freeze-dried gel,
   e) adding a crosslinking agent to said crosslinking solvent, and
   e) isolating the crosslinked gel from said crosslinking solvent, wherein said porous body is characterized in that it has an open-celled 3-dimensional lattice structure, a density of less than about 1.0 $g/cm^3$, a surface area of equal to or greater than about 30 $m^2/g$, and a compression strength of equal to or less than about 75% yield at 300 psi.

8. The process of claim 7, wherein said hydrogel polymer is selected from the group consisting of alginates, gums, dextrins, agar, gelatins, casein, collagen, polyvinyl alcohol, starch/acrylate copolymers, and mixtures thereof.

9. The process of claim 7, wherein said crosslinking solvent is selected from the group consisting of acetone, chloroform, dimethyl sulfoxide, toluene, pyridine, and xylene.

10. The process of claim 7, wherein said crosslinking agent is selected from the group consisting of diisocyanates, diacid halides, diepoxides, epichlorohydrin, aldehydes, dialdehydes, trimetaphosphates, vinyl sulfones, urea-formaldehydes and di-halogenated aliphatics.

* * * * *